United States Patent [19]
Benitz et al.

[11] Patent Number: 6,113,645
[45] Date of Patent: Sep. 5, 2000

[54] SIMULATED PLAY OF INTERACTIVE MULTIMEDIA APPLICATIONS FOR ERROR DETECTION

[75] Inventors: Angela Jane Benitz; Seiken Nakama, both of San Francisco, Calif.

[73] Assignee: Scientific Learning Corp., Berkeley, Calif.

[21] Appl. No.: 09/064,895

[22] Filed: Apr. 22, 1998

[51] Int. Cl.$^7$ ........................................ G06F 13/10
[52] U.S. Cl. .............................. 703/22; 703/27; 703/23; 714/38; 714/46
[58] Field of Search ................... 395/500.42, 500.43, 395/500.44, 500.46, 500.48, 568, 500.1; 364/140.09; 714/28, 32, 38, 46, 799, 819

[56] References Cited

U.S. PATENT DOCUMENTS

| | | | |
|---|---|---|---|
| 4,696,003 | 9/1987 | Kerr et al. | 714/46 |
| 4,759,717 | 7/1988 | Larochelle et al. | 434/118 |
| 4,796,258 | 1/1989 | Boyce et al. | 371/16 |
| 4,845,712 | 7/1989 | Sanner et al. | 371/25 |
| 4,895,518 | 1/1990 | Arnold et al. | 434/118 |
| 5,035,625 | 7/1991 | Munson et al. | 434/332 |
| 5,045,994 | 9/1991 | Belfer et al. | 395/500.46 |

(List continued on next page.)

FOREIGN PATENT DOCUMENTS 61-060511  3/1986  Japan ............................. H01L 23/32

OTHER PUBLICATIONS

Wang et al., "A Verification of the Evaluation Tools for Evaluating Multi–media Co–Operative Authoring Evaluation", Interational Conference on Integrated Broadband Services and Networks, 1990, pp. 335–340.

Ellis, A., "Design, Implementation and Testing for Multimedia Industrial Experience Projects", Annual Joint Conference Inegrating Technology into Computer Science Education, pp. 119–121, Jun. 1996.

*Primary Examiner*—Kevin J. Teska
*Assistant Examiner*—Douglas W. Sergent
*Attorney, Agent, or Firm*—James D. Ivey

[57] ABSTRACT

An interactive multimedia application executes in a debug mode in which a tester can specify a particular classification of user event and a user event satisfying the particular classification is emulated. For example, classifications can include correct and incorrect responses. To emulate a correct response, an interactive module of the interactive multimedia application determines correct criteria and provides those criteria to a debug manager upon request. In addition, characterization of user events is performed by a user interface module which communicates user events in the form of event messages to the interactive module. The debug manager emulates a user event of the particular category by retrieving the classification criteria from the interactive module, forming an event message representing an event satisfying the criteria for the particular classification, and sending the event message to the interactive module. Accordingly, the interactive module receives an event message which could have come from either the debug manager or the user interface module. As such, the particular computer instructions executed by the interactive module in response to the event are the same regardless of whether the event is emulated.

15 Claims, 12 Drawing Sheets

U.S. PATENT DOCUMENTS

| | | | |
|---|---|---|---|
| 5,149,084 | 9/1992 | Dalebout et al. | 482/3 |
| 5,220,658 | 6/1993 | Kerr et al. | 395/500.43 |
| 5,226,162 | 7/1993 | Daw | 395/500.43 |
| 5,267,865 | 12/1993 | Lee et al. | 434/350 |
| 5,302,132 | 4/1994 | Corder | 434/156 |
| 5,306,154 | 4/1994 | Ujita et al. | 434/218 |
| 5,325,377 | 6/1994 | Tuttle | 714/819 |
| 5,344,326 | 9/1994 | Ferris | 434/336 |
| 5,387,104 | 2/1995 | Corder | 434/156 |
| 5,410,681 | 4/1995 | Jessen et al. | 395/50.48 |
| 5,424,945 | 6/1995 | Bell | 364/419.2 |
| 5,437,555 | 8/1995 | Ziv-El | 434/336 |
| 5,441,415 | 8/1995 | Lee et al. | 434/350 |
| 5,466,159 | 11/1995 | Clark et al. | 434/322 |
| 5,513,126 | 4/1996 | Harkins et al. | 364/514 A |
| 5,519,469 | 11/1996 | Pike | 395/326 |
| 5,530,804 | 6/1996 | Edgington et al. | 395/186.06 |
| 5,590,360 | 12/1996 | Edwards | 395/800 |
| 5,597,312 | 1/1997 | Bloom et al. | 434/362 |
| 5,602,982 | 2/1997 | Judd et al. | 395/326 |
| 5,612,869 | 3/1997 | Letzt et al. | 395/203 |
| 5,640,537 | 6/1997 | Jessen et al. | 395/500.44 |
| 5,649,826 | 7/1997 | West et al. | 434/157 |
| 5,669,000 | 9/1997 | Jessen et al. | 395/704 |
| 5,678,571 | 10/1997 | Brown | 128/898 |
| 5,682,310 | 10/1997 | Pedneau et al. | 364/280 |
| 5,692,906 | 12/1997 | Corder | 434/156 |
| 5,694,546 | 12/1997 | Reisman | 395/326 |
| 5,711,671 | 1/1998 | Geeslin et al. | 434/236 |
| 5,722,418 | 3/1998 | Bro | 128/732 |
| 5,727,950 | 3/1998 | Cook et al. | 434/350 |
| 5,727,951 | 3/1998 | Ho et al. | 434/362 |
| 5,737,396 | 4/1998 | Garcia | 379/88 |
| 5,743,746 | 4/1998 | Ho et al. | 434/332 |
| 5,751,953 | 5/1998 | Shiels et al. | 395/200.09 |
| 5,762,503 | 6/1998 | Hoo et al. | 434/237 |
| 5,764,912 | 6/1998 | Rosborough | 395/200.54 |
| 5,764,989 | 6/1998 | Gustafsson et al. | 395/704 |
| 5,774,865 | 6/1998 | Glynn | 705/2 |
| 5,779,486 | 7/1998 | Ho et al. | 434/353 |
| 5,781,449 | 7/1998 | Rosborough | 364/514 R |
| 5,788,508 | 8/1998 | Lee et al. | 434/350 |
| 5,813,863 | 9/1998 | Sloane et al. | 434/236 |
| 5,823,788 | 10/1998 | Lemelson et al. | 434/350 |
| 5,829,983 | 11/1998 | Koyama et al. | 434/118 |
| 5,836,304 | 11/1998 | Kellinger et al. | 600/306 |
| 5,838,920 | 11/1998 | Rosborough | 395/200.54 |

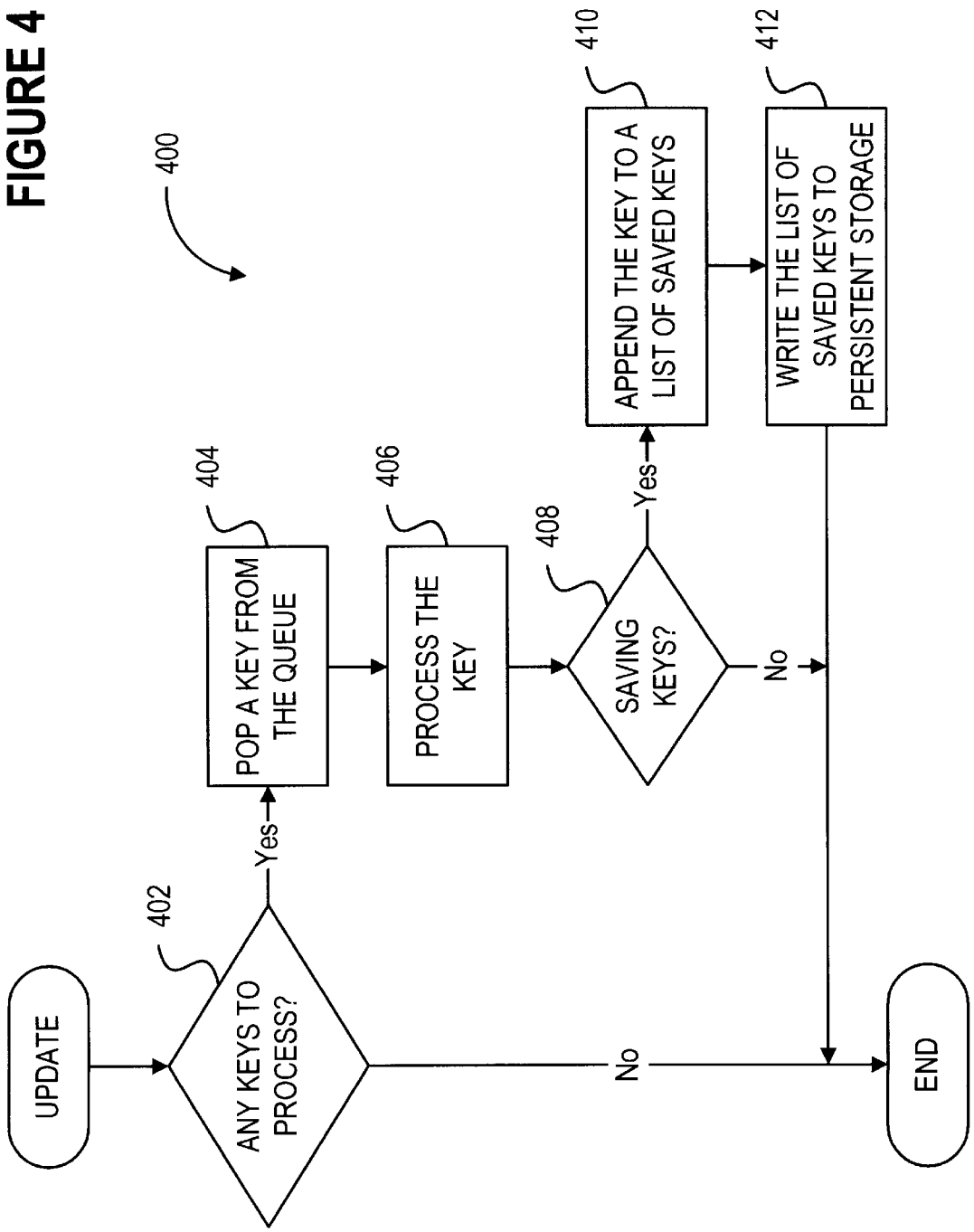

SIMULATED PLAY OF INTERACTIVE MULTIMEDIA APPLICATIONS FOR ERROR DETECTION

CROSS REFERENCE TO RELATED APPLICATIONS

This application is related to co-pending (1) U.S. patent application Ser. No. 08/995,964, entitled "Remote Computer-Assisted Compliance Monitoring System," filed Dec. 22, 1997 by Dr. Bret E. Peterson et al. (hereinafter "the Compliance Monitoring Application"), (2) U.S. patent application Ser. No. 08/995,497, entitled "Migration Mechanism for User Data from One Client Computer System to Another," filed Dec. 22, 1997 by Dr. Bret E. Peterson et al. (hereinafter "the Migration Application"), (3) U.S. patent application Ser. No. 08/995,650, entitled "Remote Computer-Assisted Professionally Supervised Training System," filed Dec. 22, 1997 by Dr. Bret E. Peterson et al. (hereinafter "the Remote Supervision Application"), (4) U.S. patent application Ser. No. 09/012,809, entitled Uniform Motivation for Multiple Computer-Assisted Training Systems, filed Jan. 23, 1998 by Dr. William M. Jenkins et al. (hereinafter "the Adaptive Motivation Application"), and (5) U.S. Pat. No. 5,927,988 by William M. Jenkins et al. and entitled "Method and Device for Training of Sensory Perceptual System in LLI Subjects" (hereinafter "the Training Application") which are all incorporated herein by reference in their entirety for all purposes.

FIELD OF THE INVENTION

The present invention relates to testing systems for computer-implemented interactive multimedia applications and, in particular, to a particularly effective mechanism by which a developer of computer-implemented interactive multimedia applications can test various behavioral aspects of such computer-implemented interactive multimedia applications.

BACKGROUND OF THE INVENTION

For some years now, interactive multimedia computer applications have grown tremendously in popularity for both entertainment and educational purposes. Since arcade and home style video computer games are generally controlled by one form or another of an electronic computer, all such computer games, including those played using a general purpose computer, are referred to herein as interactive multimedia applications. The popularity of interactive multimedia applications owes a great deal to the feeling of immersion experienced by the user as a result of the synchronized, concerted presentation of motion video and audio content. Adding to the barrage of sensory content provide by such coordinated audiovisual presentations are new devices such as (i) virtual reality goggles which block peripheral vision such that the user is limited to the visual presentation of the computer, (ii) virtual reality gloves which allow the user to interact with a multimedia application with simple and familiar hand gestures, and (iii) tactile feedback user input devices which use servomechanisms. Such tactile feedback user input devices add tactile content to the multimedia presentation experienced by the user.

Interactive multimedia applications are generally exceedingly complex. In addition, interactive multimedia applications are designed and implemented by human software engineers who are fallible as are all human beings. Interactive multimedia applications can have errors in various levels of the design and implementation. Such errors can be present in the syntax of computer instructions of which the interactive multimedia application is composed, in the combining of the computer instructions in such a way that an unintended behavior is implemented, or in the overall design such that the intended behavior does not produce the intended effect.

At the first level, computer instructions have a specific syntax and failure to comply with the specific syntax produces computer instructions which cannot be carried out by the computer for which the interactive multimedia application is designed. Such violations of the syntax of the computer instructions of which the interactive multimedia application is composed are frequently detected by compilers or interpreters which translate the computer instructions from a human intelligible, source code form into a computer executable, object code form. In addition, numerous commercially available debugger computer programs are capable of assuring that a particular collection of computer instructions comply with a particular syntax.

At the second level, the computer instructions may comply with the syntax of the computer instructions, but the computer instructions as combined may fail to implemented a desired behavior. In other words, the computer instructions as combined may fail to comport with a specified design of an application. Such errors in the behavior of an interactive multimedia application can be at a simple computational level, e.g., an unintended divide-by-zero error or resource leaks, or can be at a complex, multimedia level, e.g., mismatched audio and motion video content.

At the third level, an accurately implemented design of an interactive multimedia application may fail to have a desired effect. For example, an interactive multimedia training system may fail to improve skills of the user or a computer game may fail to entertain.

Generally, a software engineer designing and implementing an interactive multimedia application performs a number of tests to ensure that the interactive multimedia application is free of errors in syntax, behavior, and design. The software engineer typically uses the interactive multimedia application as an intended user would and attempts to perform all possible actions the intended user could perform to thereby verify that the interactive multimedia application behaves as intended for all such actions. However, users of interactive multimedia applications sometimes use such applications for hours thereby causing the interactive multimedia application to undergo millions of state changes. In addition, portions of the state of the interactive multimedia application persist from day to day to further complicate the possible permutations of states and state transitions that should be tested by the software engineer.

The following examples are illustrative. Consider the computer-implemented training system described in the Adaptive Motivation Application which description is incorporated herein by reference. A software engineer wishing to test a particular reward animation would have to play the game sufficiently well and for a sufficient period of time for the particular reward animation to be played since the reward animation could be associated with a higher level of ability and the particular reward animations played when earned is selected with a degree of randomness. Simply calling for playback of the particular reward animation can be an inadequate test since, in actual use, the reward animation will contend with other components of the training system for computer resources and will play in the context of a state of the training system resulting from hours of use and a multitude of state changes.

The training system described in the Adaptive Motivation Application also includes a variable ratio reinforcement mechanism which presents an animated nugget at random intervals and that description is incorporated herein by reference. For example, such nuggets are presented in response to 3% of all correct responses by the user. Accordingly, a software engineer hoping to test presentation of such a nugget should expect to respond correctly to approximately 33 stimuli, on average, before the nugget will be presented. If the nugget is randomly selected from a collection of nuggets, the software engineer can expect to respond to an intolerable number of stimuli before triggering presentation of the specific nugget.

Suppose further that the software engineer, after hours of use of the interactive multimedia application, causes the interactive multimedia application to behave incorrectly. To properly identify and correct the error in the configuration of the interactive multimedia application, the software engineer must generally be able to re-create the error. Without the ability to re-create the error, it is unlikely that the software engineer can spend the requisite amount of time studying the behavior of the interactive multimedia application and testing subsequent revisions of the interactive multimedia application to verify that the error in behavior has been successfully corrected.

What is needed is a mechanism for thorough, repeatable testing of complex interactive multimedia applications.

SUMMARY OF THE INVENTION

In accordance with the present invention, an interactive multimedia application executes in a debug mode in which a tester can specify a particular classification of user event and a user event satisfying the particular classification is emulated. For example, classifications can include correct and incorrect responses. To emulate a correct response, an interactive module of the interactive multimedia application determines correct criteria and provides those criteria to a debug manager upon request. In addition, characterization of user events is performed by a user interface module which communicates user events in the form of event messages to the interactive module. The debug manager emulates a user event of the particular category by retrieving the classification criteria from the interactive module, forming an event message representing an event satisfying the criteria for the particular classification, and sending the event message to the interactive module. Accordingly, the interactive module receives an event message which could have come from either the debug manager or the user interface module. As such, the particular computer instructions executed by the interactive module in response to the event are the same regardless of whether the event is emulated.

Allowing such accurate emulation of user events enables rapid emulation of the interactive multimedia application and prolonged, automated emulation of use of the interactive multimedia application.

BRIEF DESCRIPTION OF THE DRAWINGS

FIG. 4 is a logic flow diagram of an update procedure of an debug manager of FIG. 1.

DETAILED DESCRIPTION

In accordance with the present invention, an interactive multimedia application executes in a debug mode in which the user can specify correct or incorrect responses to stimuli without actually recognizing the stimuli and determining which of a number of possible responses is correct. A correct response or an incorrect response, whether by actual recognition of the stimuli or by explicit specification in debug mode, causes the interactive multimedia application to change its state and exhibit behavior in response to the response. Thus, a software engineer can specify a correct or incorrect response and observe the behavior of the interactive multimedia application in response thereto without having to develop the skill and ability to recognize the stimuli of the interactive multimedia application and to respond correctly. The software engineer can therefore quickly proceed through various levels of the interactive multimedia application without having to develop skill in responding correctly to stimuli.

In addition, responses to stimuli, whether explicitly specified in the debug mode or through normal use of the interactive multimedia application, are stored for subsequent playback. In a playback mode, the interactive multimedia application retrieves data specifying user response events from persistent storage and changes its state and exhibits behavior in response to the retrieved user response events. This playback mode can be used to re-create errors caused during extended testing of the interactive multimedia application or to re-create the multimedia experience of a user. Re-creating the multimedia experience of a user can be helpful in clarifying questions the user might have regarding the use of the interactive multimedia application or in reproducing an error encountered by the user during use of the interactive multimedia application.

Figure 1:
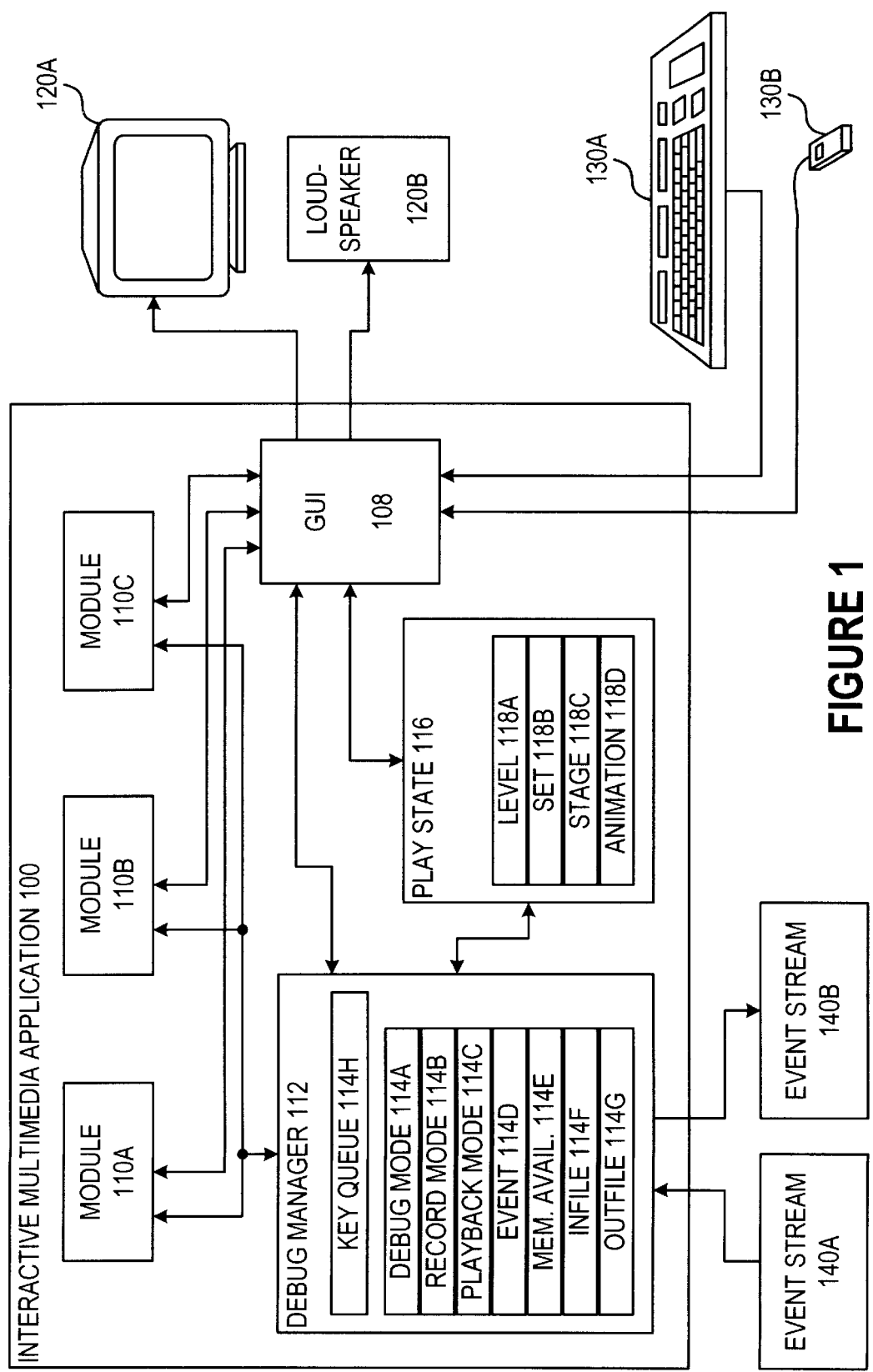
FIG. 1 is a block diagram of an interactive multimedia application which implements a debug mechanism according to the present invention.

An interactive multimedia application 100 is shown in FIG. 1. Interactive multimedia application 100 includes a number of modules 110A–C, each of which interacts with a user through a graphical user interface (GUI) 108. In this illustrative embodiment, each of modules 110A–C is a training program such as Old McDonald's Flying Farm, Block Commander, and Phoneme Identification which are described in the Training Application and the Adaptive Motivation Application and those descriptions are incorporated herein by reference. In general, GUI 108 presents multimedia content on a computer display device 120A and a loudspeaker 120B and receives user input signals from user input devices 130A–B.

Interactive multimedia application 100 also includes a play state 116 which changes in response to actions by the user in response to the multimedia display as indicated by signals received through GUI 108 from user input devices 130A–B. In addition, interactive multimedia application 100 includes a debug manager 112 which stores a debug state and implements a testing mechanism of interactive multimedia application 100 in accordance with the present invention.

Modules 110A–C implement the designed functionality of interactive multimedia application 100 and that implementation is the subject of testing by debug manager 112. Modules 110A–C are described more completely below. Briefly, modules 110A–C interact with GUI 108 to present multimedia stimuli to the user through computer display device 120A and loudspeaker 120B and to receive response events which are responsive to the stimuli and which are generated by a user through physical manipulation of either or both of user input devices 130A–B. In addition, characteristics of the displayed stimuli depend at least in part upon a particular play state as represented in various fields of play state 116.

Debug Manager 112

Debug manager 112 emulates use of interactive multimedia application 100 by a user who physically manipulates user input devices 130A–B. Specifically, debug manager 112 sends events to GUI 108 which emulate events generated by a user's physical manipulation of user input devices 130A–B. The emulation by debug manager 112 of user-generated events allows a tester to request emulation of specific user events. As used herein, a tester is a human user of interactive multimedia application 100 in a debug mode, i.e., when debug manager 112 is active. By contrast, the term "end user" generally refers to a human user of interactive multimedia application 100 when debug manager 112 is inactive, i.e., when interactive multimedia application 100 is not in the debug mode.

Modules 110A–C cause debug manager 112 to update itself each time user interaction is expected. In this illustrative embodiment, modules 110A–C expect user interaction once for each frame of a multimedia display. For example, module 110A can show an animated object in a single frame by repeatedly re-drawing the object in a sequence of positions during the frame. Thus, module 110A causes debug manager 112 to update itself once for each frame of the multimedia display of module 100A in this illustrative embodiment. Modules 110B–C behave in an analogous manner.

The updating of debug manager 112 is shown as logic flow diagram 400 (FIG. 4) in which processing begins with test step 402. In test step 402, debug manager 112 determines whether any user events are represented in a key queue 114H. Key queue 114H is a list of user events accessed in a first-in-first-out (FIFO) manner. The user events represented in key queue 114H in turn represent actions to be taken by debug manager 112 in emulating use of interactive multimedia application 100. If no such user events are represented in key queue 114H, processing according to logic flow diagram 400 (FIG. 4) completes. It should be noted that, in the absence of emulation of use of interactive multimedia application 100 by debug manager 112, interactive multimedia application 100 acts in accordance with the programming of modules 110A–C, i.e., as interactive multimedia application 100 would act in the absence of debug manager 112.

Figure 8:
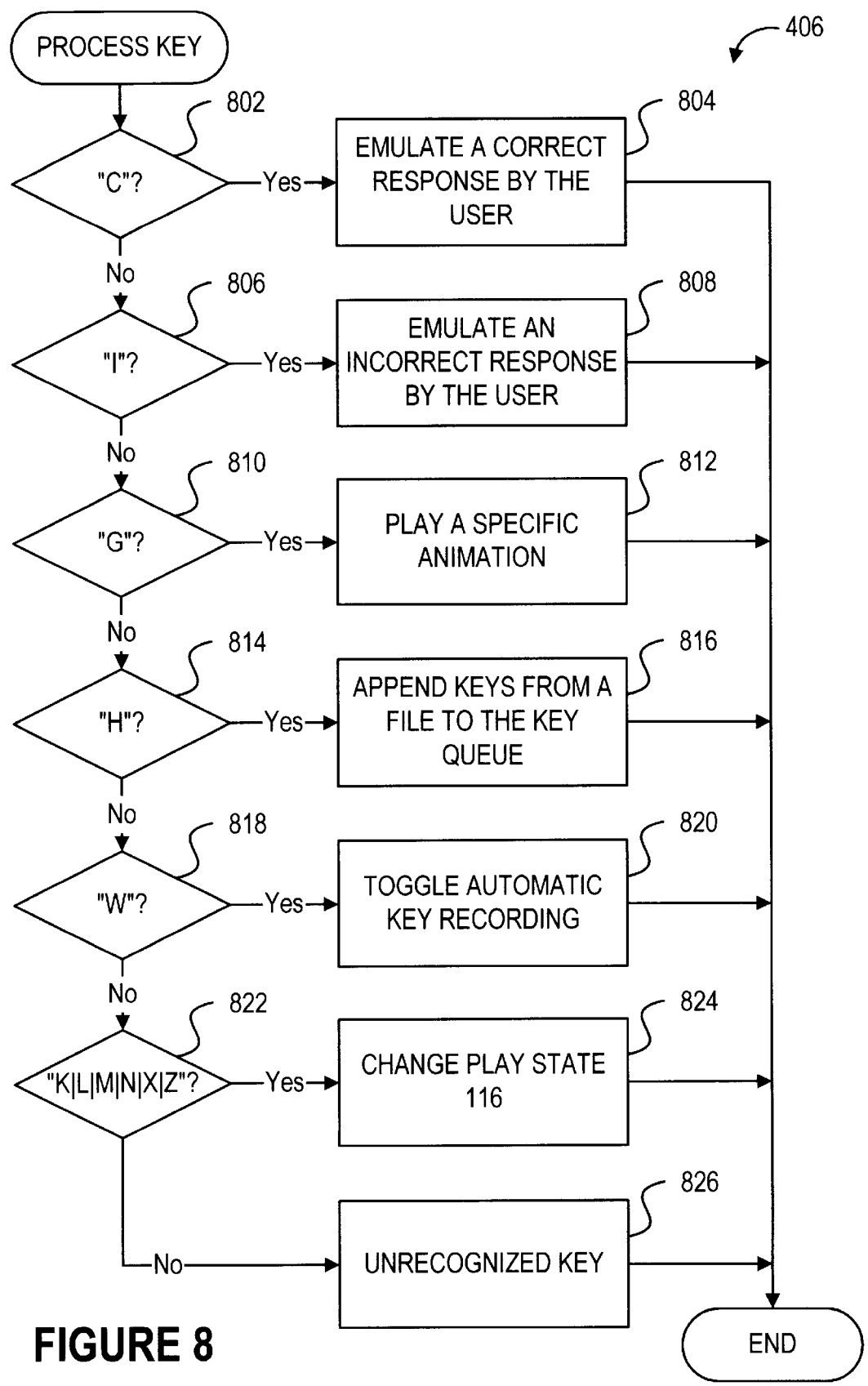
FIG. 8 is a logic flow diagram of the processing of a key by the debug manager of FIG. 1.

If, conversely, key queue 114H represents at least one user event, processing transfers from test step 402 (FIG. 4) to step 404 in which a user event is popped from the head of key queue 114H and stored in event field 114D. Processing transfers to step 406 (FIG. 4) in which debug manager 112 processes the user event. Step 406 is shown in greater detail as logic flow diagram 406 (FIG. 8).

In test step 802, debug manager 112 determines whether the user event represents a command to emulate a correct response. In this illustrative embodiment, such a command is represented by a user-generated event representing a pressing of a "C" key on a keyboard such as user input device 130A. If not, processing transfers to test step 806. Otherwise, processing transfers to step 804 in which debug manager 112 emulates an incorrect response by a user. As described below in greater detail, modules 110A–C present multimedia stimuli and receive user-generated events in response thereto. Such events are classified according to categories of events modules 110A–C are configured to recognize. In this illustrative embodiment, such classifications include correct responses and incorrect responses. The emulation of a correct response is described below in greater detail. Briefly, debug manager 112 sends data representing events such as movement and actuation of user input device 130B which are consistent with a correct response by an emulated user to GUI 108. Such is described more completely below. Thus, when GUI 108 receives the events from debug manager 112, GUI 108 treats those events as if those events were in fact generated by a user's physical manipulation of user input device 130B. As a result, a tester can issue a command to emulate a correct response to thereby evoke the same action interactive multimedia application 100 would carry out in response to a correct response by a user without requiring that the user actually have the ability to respond correctly to the multimedia stimulus presented by interactive multimedia application 100. After step 804 (FIG. 8), processing according to logic flow diagram 406, and therefore step 406 (FIG. 4), completes.

In test step 806 (FIG. 8), debug manager 112 determines whether the user event represents a command to emulate an incorrect response. In this illustrative embodiment, such a command is represented by a user-generated event representing a pressing of an "I" key on a keyboard such as user input device 130A. If not, processing transfers to test step 810. Otherwise, processing transfers to step 808 in which debug manager 112 emulates an incorrect response by a user. The emulation of an incorrect response is described below in greater detail. Briefly, debug manager 112 sends data representing events such as movement and actuation of user input device 130B which are consistent with an incorrect response by an emulated user to GUI 108. Such is described more completely below. Thus, when GUI 108 receives the events from debug manager 112, GUI 108 treats those events as if those events were in fact generated by a user's physical manipulation of user input device 130B. As a result, a tester can issue a command to emulate an incorrect response to thereby evoke the same action interactive multimedia application 100 would carry out in response to an incorrect response by a user without requiring that the user actually have the ability to determine which response is incorrect with respect to the multimedia stimulus presented by interactive multimedia application 100. After step 808 (FIG. 8), processing according to logic flow diagram 406, and therefore step 406 (FIG. 4), completes.

In test step 810 (FIG. 8), debug manager 112 determines whether the user event represents a command to play a particular animation. In this illustrative embodiment, such a command is represented by a user-generated event representing a pressing of an "G" key on a keyboard such as user input device 130A. If not, processing transfers to test step 814. Otherwise, processing transfers to step 812 in which debug manager 112 allows the tester to specify a particular animation and invokes playback of the specified animation. The tester can specify a particular animation by entering data uniquely identifying the animation or by selecting an identifier of the animation from a list of animation identifiers using conventional user interface techniques. In one embodiment, the specific animation is played immediately. In an alternative embodiment, the specified animation is represented by animation field 118D and is played the next time a reward animation is earned, e.g., by responding correctly a requisite number of times. The ability to specify a particular animation for presentation during testing of interactive multimedia application 100 is particularly useful in determining that animations which use a relatively large amount of computer resources can be rendered in the context of interactive multimedia application 100. Specifically, the tester can verify that interactive multimedia application 100 leaves sufficient resources available to properly render such an animation. After step 812 (FIG. 8), processing according to logic flow diagram 406, and therefore step 406 (FIG. 4), completes.

Figure 13:
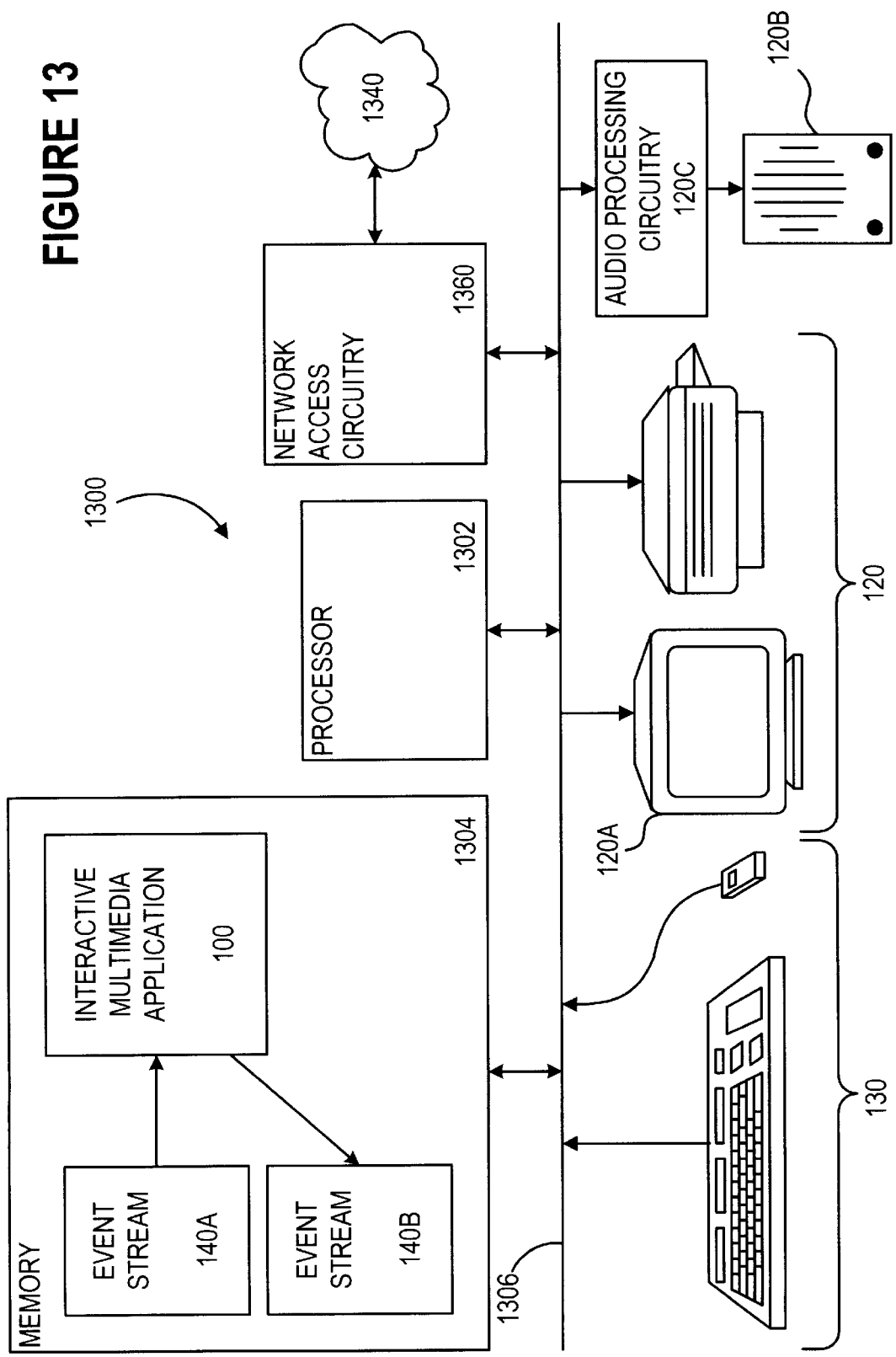
FIG. 13 is a block diagram of a computer system within which the interactive multimedia application of FIG. 1 executes.

In test step 814 (FIG. 8), debug manager 112 determines whether the user event represents a command to retrieve a stream of user events from persistent storage for automatic playback. In this illustrative embodiment, such a command is represented by a user-generated event representing a pressing of an "H" key on a keyboard such as user input device 130A. If not, processing transfers to test step 818. Otherwise, processing transfers to step 816 in which debug manager 112 allows the tester to specify a data file stored in persistent storage of memory 1304 (FIG. 13). In this illustrative example, the test specifies event stream 140A (FIG. 1) as the stream of events. In step 816 (FIG. 8), debug manager 112 (FIG. 1) retrieves data representing a number of events from event stream 140A and appends the retrieved data to key queue 114H. The ability to retrieve user events from persistent storage and queue the events for processing by debug manager 112 is particular useful in testing and evaluating interactive multimedia application 100. As described more completely below, such enables emulation of prolonged use of interactive multimedia application 100 and recreation of erroneous behavior of interactive multimedia application 100, e.g., from an invalid state which results from a particular sequence of many state changes. After step 816 (FIG. 8), processing according to logic flow diagram 406, and therefore step 406 (FIG. 4), completes.

In test step 818 (FIG. 8), debug manager 112 determines whether the user event represents a command to enable or disable recording of user events as represented in record mode field 114B of debug manager 112. In this illustrative embodiment, such a command is represented by a user-generated event representing a pressing of a "W" key on a keyboard such as user input device 130A. If not, processing transfers to test step 822. Otherwise, processing transfers to step 820 in which debug manager 112 toggles the recording mode between disabled and enabled and stores the state of the recording mode as toggled in record mode field 114B. The recording of user events is described more completely below. After step 820 (FIG. 8), processing according to logic flow diagram 406, and therefore step 406 (FIG. 4), completes.

In test step 822 (FIG. 8), debug manager 112 determines whether the user event represents a command to alter play state 116. In this illustrative embodiment, such a command is represented by a user-generated event representing a pressing of a "K," "L," "M," "N," "X," or "Z" key on a keyboard such as user input device 130A. If so, processing transfers to step 824 in which debug manager 112 alters play state 116 in accordance with the user event. Specifically, play state 116 includes a level field 118A, a set field 118B, and a stage field 118C, each of which specifies a particular characteristic of multimedia stimuli to which the user is to respond. Pressing "K" decrements the stimulus stage as represented stage field 118C; pressing "L" increments the stimulus stage as represented in stage field 118C; pressing "M" decrements the stimulus set as represented in set field 118B; pressing "N" increments the stimulus set as represented in set field 118B; pressing "X" decrements the stimulus level as represented in level field 118A; and pressing "Z" increments the stimulus level as represented in level field 118A. In this way, the tester can verify that interactive multimedia application 100 behaves properly at all possible permutations of play state 116 without having to use interactive multimedia application 100 for endless hours to acquire the requisite skills to reach the more difficult levels, stages, and sets of interactive multimedia application 100. After step 824 (FIG. 8), processing according to logic flow diagram 406, and therefore step 406 (FIG. 4), completes.

If debug manager 112 determines in test step 822 (FIG. 8) that the user event does not represent a command to alter play state 116 (FIG. 1), the user event is not recognized as a valid command and processing transfers to step 826. Of course, other commands can be recognized in the manner described above with respect to test steps 802, 806, 810, 814, 818, and 822. Such commands include commands to show or hide or update a status display, which is described more completely below, to quit or timeout interaction with the particular active one of modules 110A–C (FIG. 1), or to display specific information about interactive multimedia application 100. In step 826, debug manager 112 can inform the tester that an invalid command has been received by playing a short beep through loudspeaker 120B or, alternative, can take no action.

After debug manager 112 processes the user event in step 406 (FIG. 4), processing transfers to test step 408 in which debug manager 112 determines whether recording mode is enabled as represented in record mode field 112B. If recording mode is disabled, processing according logic flow diagram 400 (FIG. 4) completes. Conversely, if recording mode is enabled, processing transfers to step 410 in which debug manager 112 (FIG. 1) appends data representing the user event retrieved from key queue 114H in step 404 (FIG. 4) to a list of saved user events, e.g., to event stream 140B. In step 412 (FIG. 4), debug manager 112 causes event stream 140B to be stored in persistent storage such that event stream 140B is preserved in the event of an unanticipated failure and termination of interactive multimedia application 100. After step 412 (FIG. 4), processing according to logic flow diagram 400 completes.

Thus, in the debug mode, debug manager 112 processing a single user event of key queue 114H each time user interaction is expected. Such user events can cause debug manager 112 to emulate a correct or incorrect user response, to alter play state 116, to play a specific animation, to retrieve a collection of recorded user events for playback, or to record user events for subsequent playback.

Figure 9:
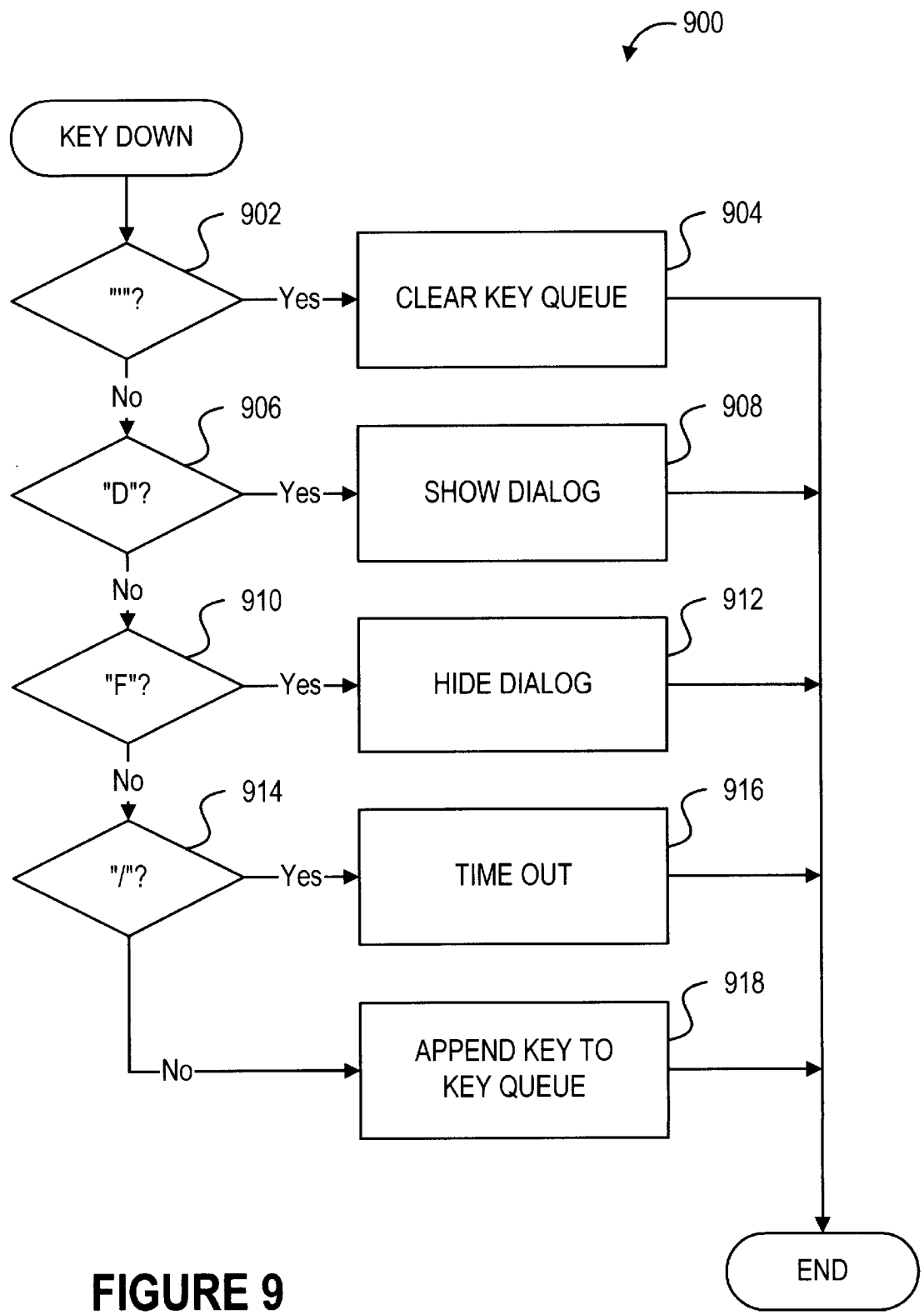
FIG. 9 is a logic flow diagram of the processing by debug manager of FIG. 1 of event messages received from a user interface module of FIG. 1.

Other than those user events retrieved from event stream 140A in the manner described above in step 816 (FIG. 8), key queue 114H is populated with user events received by debug manager 112 from GUI 108 in the manner shown as logic flow diagram 900 (FIG. 9).

In test step 902, debug manager 112 (FIG. 1) determines whether the user event represents a command to clear key queue 114H. In this illustrative embodiment, such a command is represented by a user-generated event representing a pressing of a """ key on a keyboard such as user input device 130A. If not, processing transfers to test step 906. Otherwise, processing transfers to step 904 in which debug manager 112 clears key queue 114H. As a result, the tester can stop debug manager 112 from processing a multitude of user events represented in key queue 114H. Since key queue 114H can store data representing hundreds or thousands or more user events, the ability of the test to stop processing of so many user events when such is not necessary saves valuable time in developing and test interactive multimedia application 100. After step 904 (FIG. 9), processing according to logic flow diagram 900 completes.

In test step 906, debug manager 112 (FIG. 1) determines whether the user event represents a command to show a debug dialog. In this illustrative embodiment, such a command is represented by a user-generated event representing a pressing of a "D" key on a keyboard such as user input device 130A. If not, processing transfers to test step 910. Otherwise, processing transfers to step 908 in which debug manager 112 displays a debug dialog in the manner described more completely below. As described more completely below, the debug dialog presents information regarding the state of interactive multimedia application 100 during execution. After step 908 (FIG. 9), processing according to logic flow diagram 900 completes.

In test step 910, debug manager 112 (FIG. 1) determines whether the user event represents a command to hide the debug dialog. In this illustrative embodiment, such a command is represented by a user-generated event representing a pressing of a "F" key on a keyboard such as user input device 130A. If not, processing transfers to test step 914. Otherwise, processing transfers to step 912 in which debug manager 112 removes display of the debug dialog from computer display device 120A. After step 912 (FIG. 9), processing according to logic flow diagram 900 completes.

In test step 914, debug manager 112 (FIG. 1) determines whether the user event represents a command to timeout. In this illustrative embodiment, such a command is represented by a user-generated event representing a pressing of a "/" key on a keyboard such as user input device 130A. If so, processing transfers to step 916 in which debug manager 112 signals the active one of modules 110A–C, e.g., module 110A, to timeout. In this illustrative embodiment, termination of processing by each of modules 110A–C can be accomplished by either of two events. First, the user can generate an event indicating a wish to terminate such processing. The active module, e.g., module 110A, verifies that the user in fact wishes to terminate and requires verification in the form of an additional user event, e.g., a mouse click on a GUI button indicating a "Yes" response to the question, "Do you really want to quit?" Second, each of modules 110A–C automatically terminates after a predetermined period of time, e.g., twenty minutes, and the user is not required to verify any desire to terminate processing. By allowing the tester to prematurely timeout the active module, e.g., module 110A, the tester can quickly terminate processing of the active module and move on to a subsequent task, e.g., modifying the computer instructions, and therefore the behavior, of interactive multimedia application 100. After step 916 (FIG. 9), processing according to logic flow diagram 900 completes.

Conversely, if debug manager 112 (FIG. 1) determines in test step 914 (FIG. 9) that the user event does not represent a command to timeout, processing transfers to step 918 in which debug manager 112 appends data representing the user event received from GUI 108 to the tail of key queue 114H. Thus, the user event is processed by debug manager 112 in the manner described above with respect to logic flow diagram 400 (FIG. 4). After step 918 (FIG. 9), processing according to logic flow diagram 900 completes.

Interactive Modules

Figure 2:
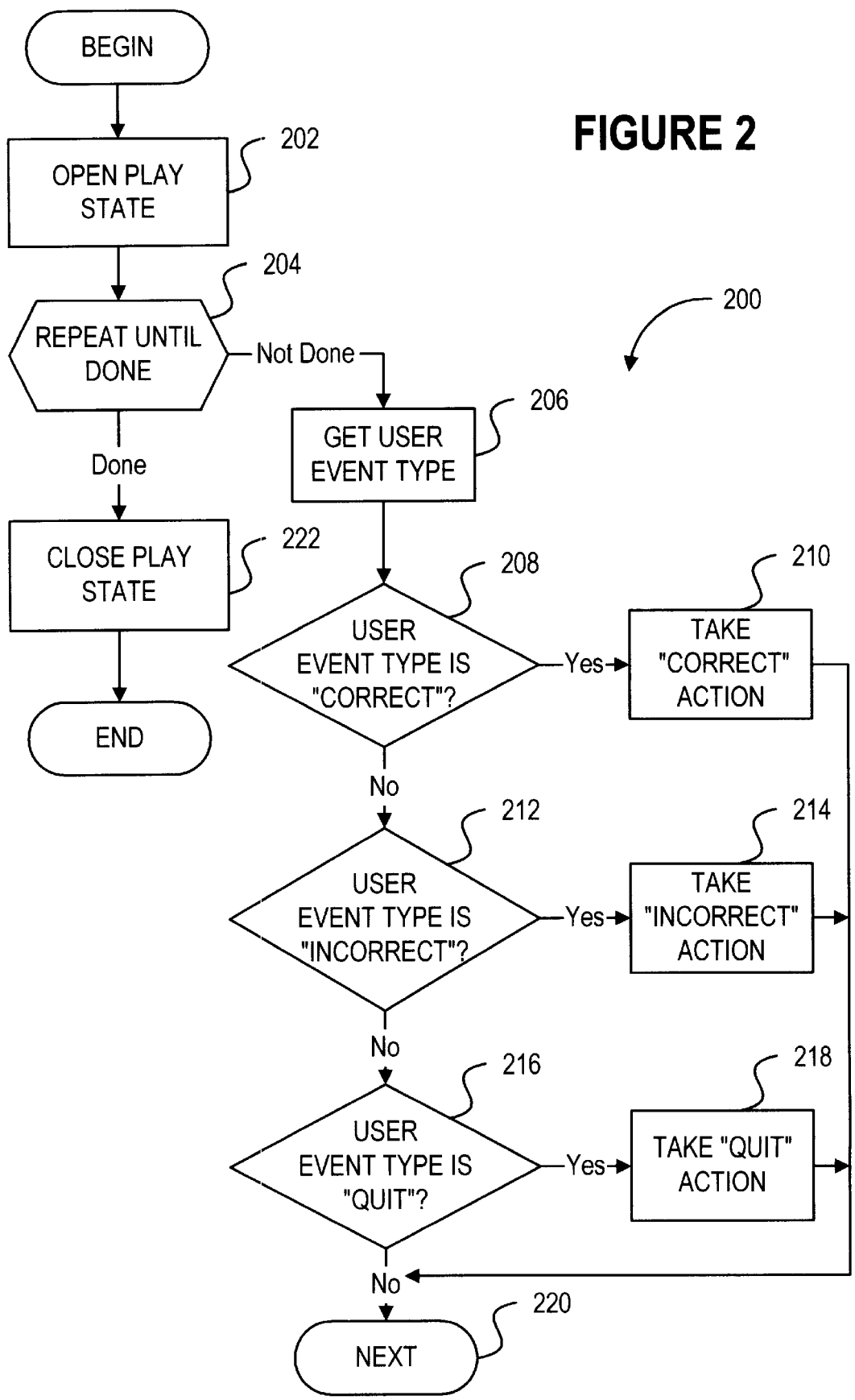
FIG. 2 is a logic flow diagram of the processing of an interactive module of FIG. 1.

As described briefly above, modules 110A–C implemented the designed interactive multimedia functionality of interactive multimedia application 100. Processing by any of modules 110A–C is shown as logic flow diagram 200 (FIG. 2). Logic flow diagram 200 is described in the context of module 110A, but the following description of logic flow diagram 200 is equally applicable to modules 110B–C. It should be noted that the particular behavior of module 110A is illustrative only and can vary significantly. Logic flow diagram 200 can be representative of the general behavior of any of a number of interactive multimedia applications. In step 202, module 110A (FIG. 1) opens play state 116. Specifically, module 110A initializes play state 116 to a beginning state or to a state recorded in persistent storage from a previous execution of module 110A.

Loop step 204 (FIG. 2) and next step 220 define a loop in which steps 206–218 are repeated until the user terminates use of module 110A, e.g., using conventional user interface techniques.

Figure 3:
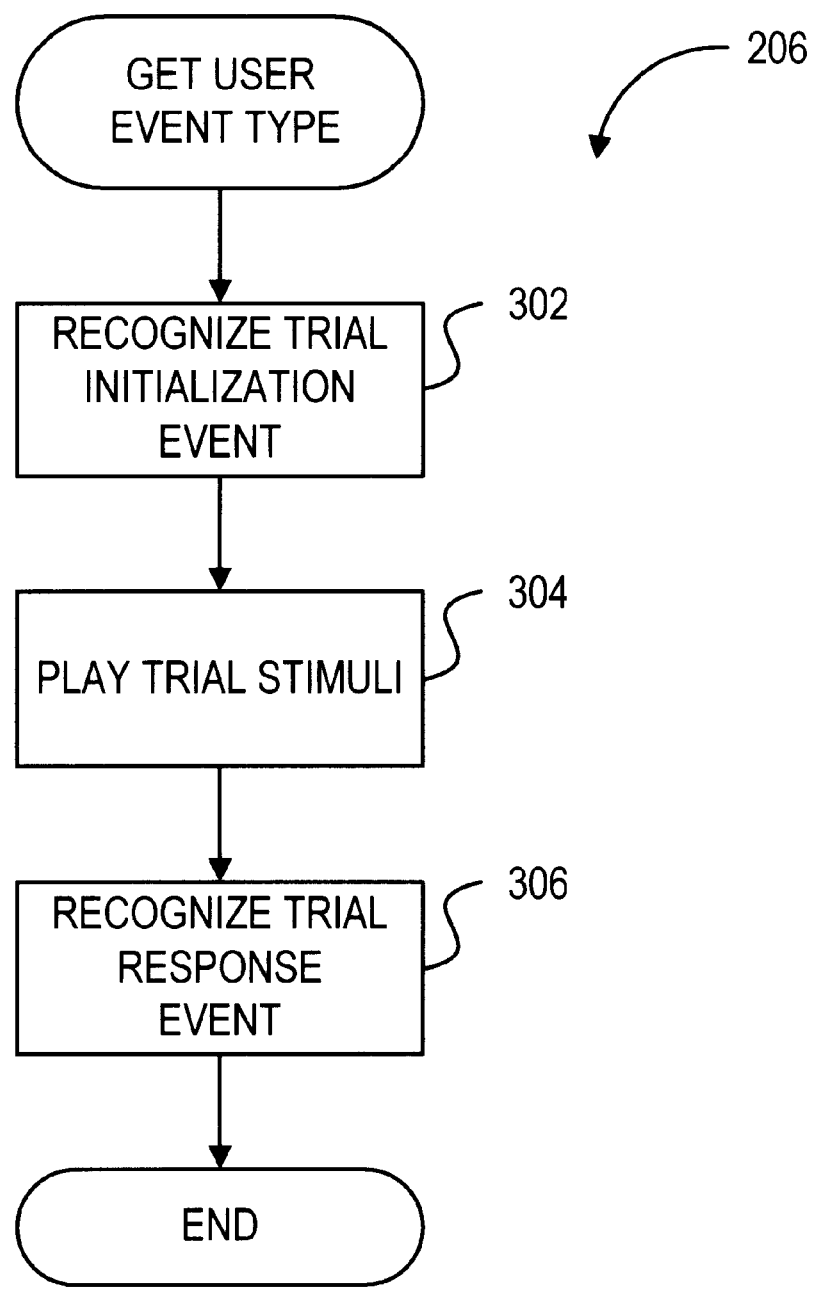
FIG. 3 is a logic flow diagram of a step of FIG. 2 in greater detail.

In step 206, module 110A gets an event type. The user event type is a characterization of the user's response to multimedia stimuli presented by module 110A. Step 206 is shown in greater detail as logic flow diagram 206 (FIG. 3). In step 302, module 110A receives an event message representative of a user event. The user event message indicates the nature of the event, e.g., a mouse button click on user input device 130B, a particular element of the multimedia image displayed in computer display device 120B with which the event is associated, and a time at which the event occurred. In step 302, the event message represents an initialization event. Such an event can include, for example, identification of a start icon (not shown) displayed in computer display device 120A. Such an event indicates a user's readiness to commence with a trial. In the context of logic flow diagram 200 (FIG. 2), a trial is a combination of a multimedia stimulus presented to the user and a user event message received by module 110A in response thereto.

In step 304, module 110A (FIG. 1) presents the multimedia stimuli to the user as a first part of the trial. Such multimedia stimuli is described in the Training Application and the Adaptive Motivation Application and those descriptions are incorporated herein by reference. In the illustrative embodiment in which module 110A (FIG. A) implements the game Block Commander, the multimedia stimuli includes a graphical representation of a grid with round and square colored blocks placed in various positions across the grid and an aural cue to touch one of the blocks, e.g., the aural instruction to the user to "touch the green square."

Figure 10:
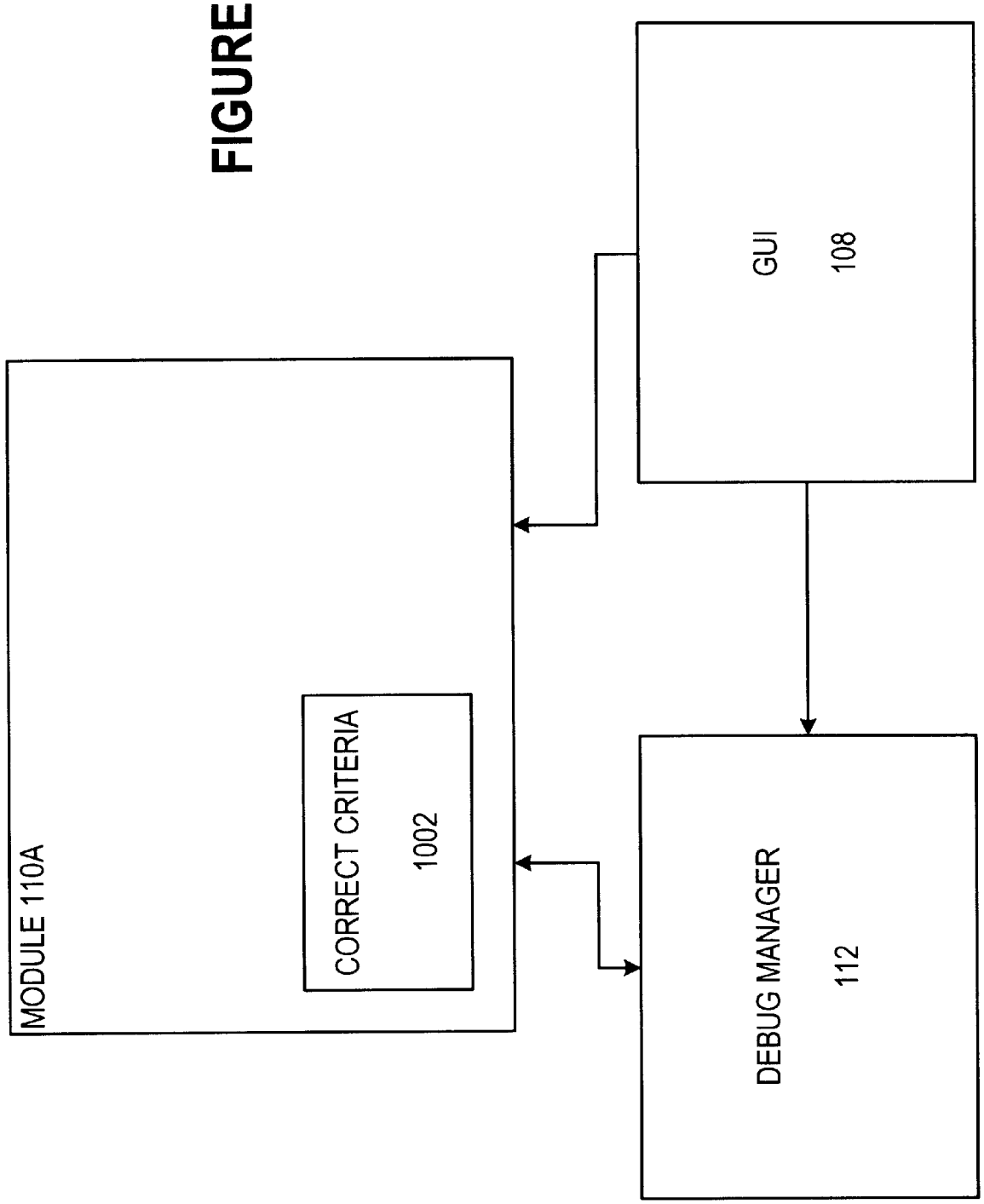
FIG. 10 is a block diagram of the interactive module, the user interface module, and the debug manager of FIG. 1.

In playing the trial stimuli, module 110A determines which element of the display the user must identify, or alternatively a window of time within which the user must respond, in order to respond correctly. Data specifying the correct response is stored in a correct criteria record 1002 (FIG. 10) of module 110A. In step 306 (FIG. 3), module 110A (FIG. 1) recognizes and characterizes a user event in response to the stimuli of step 304 (FIG. 3) by comparison of the element to which the user event correspond, or alternatively to a window of time within which the response is correct, as represented in correct criteria record 1002 (FIG. 10). In interactive multimedia applications in general, user events are characterized as belong to one of a number of types of events. In the context of the training system of the illustrative embodiment described herein, user events can be characterized as correct responses to stimuli or as incorrect responses to stimuli. In an alternative embodiment, user events can also be classified as "quit" responses to stimuli. In other embodiments, user events can be classified in other ways, e.g., to identify one of a number of objects represented in computer display device 120A.

Once the user event has been characterized in step 306 (FIG. 3), processing according to logic flow diagram 206, and therefore step 206 (FIG. 2), completes. After step 206, module 110A takes action in accordance with the configuration of module 110A as defined by the computer instructions of which module 110A is composed according to the type of user event. If the user event is correct as determined in test step 208, module 110A takes the "correct" action in step 210. If the user event is incorrect as determined in step 212, module 110A takes the "incorrect" action in step 214. If the user event indicates a wish to terminate module 110A determined in test step 216, module 110A takes the "quit" action in step 216. After steps 208–216, processing transfers through next step 220 to loop step 204 after which module 110A repeats steps 206–218 to further interact with the user.

Figure 7:
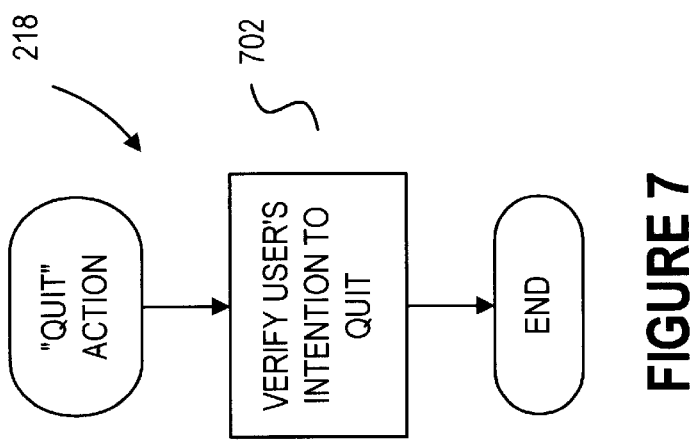
FIG. 7 is a logic flow diagram of a step of FIG. 2 in greater detail.
Figure 6:
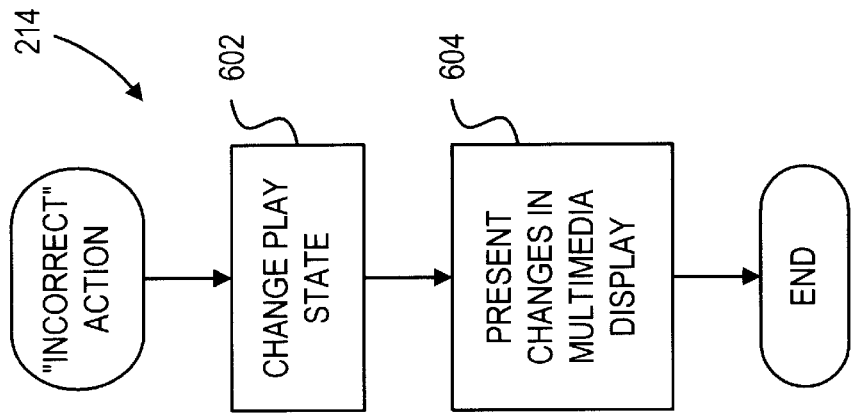
FIG. 6 is a logic flow diagram of a step of FIG. 2 in greater detail.

The particular actions taken by this illustrative example of module 110A in respective steps 210, 214, and 218 are shown in greater detail as logic flow diagrams 210 (FIG. 5), 214 (FIG. 6), and 218 (FIG. 7), respectively. Processing according to logic flow diagram 210 (FIG. 5) begins with step 502 in which module 110A (FIG. 1) changes play state 116. Such changes can include an increase in a number of points awarded to the user in a token economy and potentially a change in the level of difficulty or other aspects of play state 116 as represented in stimulus parameters 118A–C. In one embodiment, the level of difficulty is incremented when the user responds correctly three (3) consecutive times and is decremented when the user responds incorrectly. This three-up-one-down level adjustment scheme is described more completely in the training application and that description is incorporated herein by reference. The changes in play state 116 change the context in which other events in the processing of interactive multimedia application 100 occur. Accordingly, ensuring that such changes to play state 116 take place provide a realistic and accurate context within which to test various components of the behavior of interactive multimedia application 100.

In step 504 (FIG. 5), module 110A (FIG. 1) presents changes in the multimedia display of computer display device 120A and/or loudspeaker 120B. Such changes can include graphical representation of the points earned by the user in the token economy, animated progress indicators, variable ratio reinforcement mechanisms, and auditory indication of a correct response.

The token economy, animated progress indicators, and variable rate reinforcement mechanisms are described more completely in the Adaptive Motivation Application and that description is incorporated herein by reference. All such changes in the multimedia display effect changes in play state 116 and in the execution state of interactive multimedia application 100 and consume computer resources. Accordingly, such provides an accurate and realistic context within which to test various components of interactive multimedia application 100.

In test step 506 (FIG. 5), module 110A determines whether a reward animation is earned by the user's correct response. Module 110A makes such a determination according to the designed behavior of module 110A. For example, module 110A can determine that a reward animation is earned when the user has responded correctly ten (10) times since the most recently presented reward animation. In fact, the logic applied by module 110A in test step 506 (FIG. 5) can be a specific characteristic tested by the user, e.g., by explicitly specifying a correct response ten (10) times.

Figure 5:
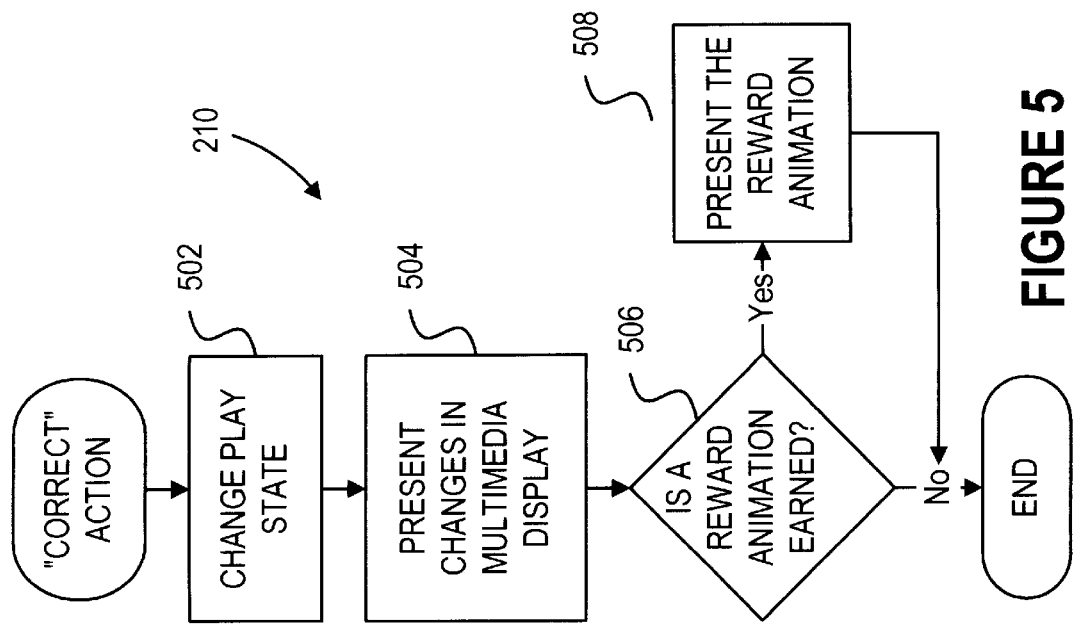
FIG. 5 is a logic flow diagram of a step of FIG. 2 in greater detail.

If a reward animation is earned, processing transfers to step 508 in which module 110A (FIG. 1) presents a reward animation using computer display device 120A and/or loudspeaker 120B. Module 110A plays the reward animation specified in animation field 118D of play state 116, which can be specified by the user in the debug mode in the manner described above. Thus, the user can test a specific reward animation in the context of the processing environment created by state and display changes of steps 502–504 (FIG. 5). For example, the user can cause a particularly resource-intensive reward animation to play to thereby verify that sufficient resources are available for the reward animation in the context of execution all other aspects of interactive multimedia application 100 (FIG. 1).

After the reward animation is presented in step 508 (FIG. 5), processing according to logic flow diagram 210, and therefore step 210 (FIG. 2), completes. If module 110A (FIG. 1) determines in test step 506 (FIG. 5) that no reward animation is earned, step 508 is skipped.

Processing by module 110A in response to an incorrect response by the user is shown as logic flow diagram 214 (FIG. 6) in which processing begins with step 602. In step 602, module 110A (FIG. 1) changes play state 116 in the manner described above with respect to step 502 (FIG. 5). In step 604 (FIG. 6), module 110A presents changes in the multimedia display in computer display device 120B and/or loudspeaker 120A in a manner generally analogous to that described above with respect to step 504 (FIG. 5), except that the changes in the multimedia display reflect an incorrect response by the user, e.g., by playing a "thunk" sound and the absence of any change in the number of points earned by the user or any change in the position of any animated progress indicator. In addition, a small animation can indicate to the user that the response was incorrect.

Thus, in steps 602–604 (FIG. 6), module 110A (FIG. 1) carries out changes in state and behavior programmed into the behavior of module 110A which is responsive to an incorrect response by the user. Accordingly, a realistic and accurate context is provided for testing various components of the behavior of interactive multimedia application 100.

Processing by module 110A in response to an indicated wish to terminate module 110A by the user is shown as logic flow diagram 218 (FIG. 7) in which module 110A (FIG. 1) verified the user's wish in a conventional manner prior to terminating processing.

To terminate processing, module 110A (FIG. 1) closes play state 116, storing play state 116 in persistent storage to facilitate resumed use of module 110A, in step 222 (FIG. 2). After step 222, processing according to logic flow diagram 200 terminates.

Graphical User Interface 108

Figure 11:
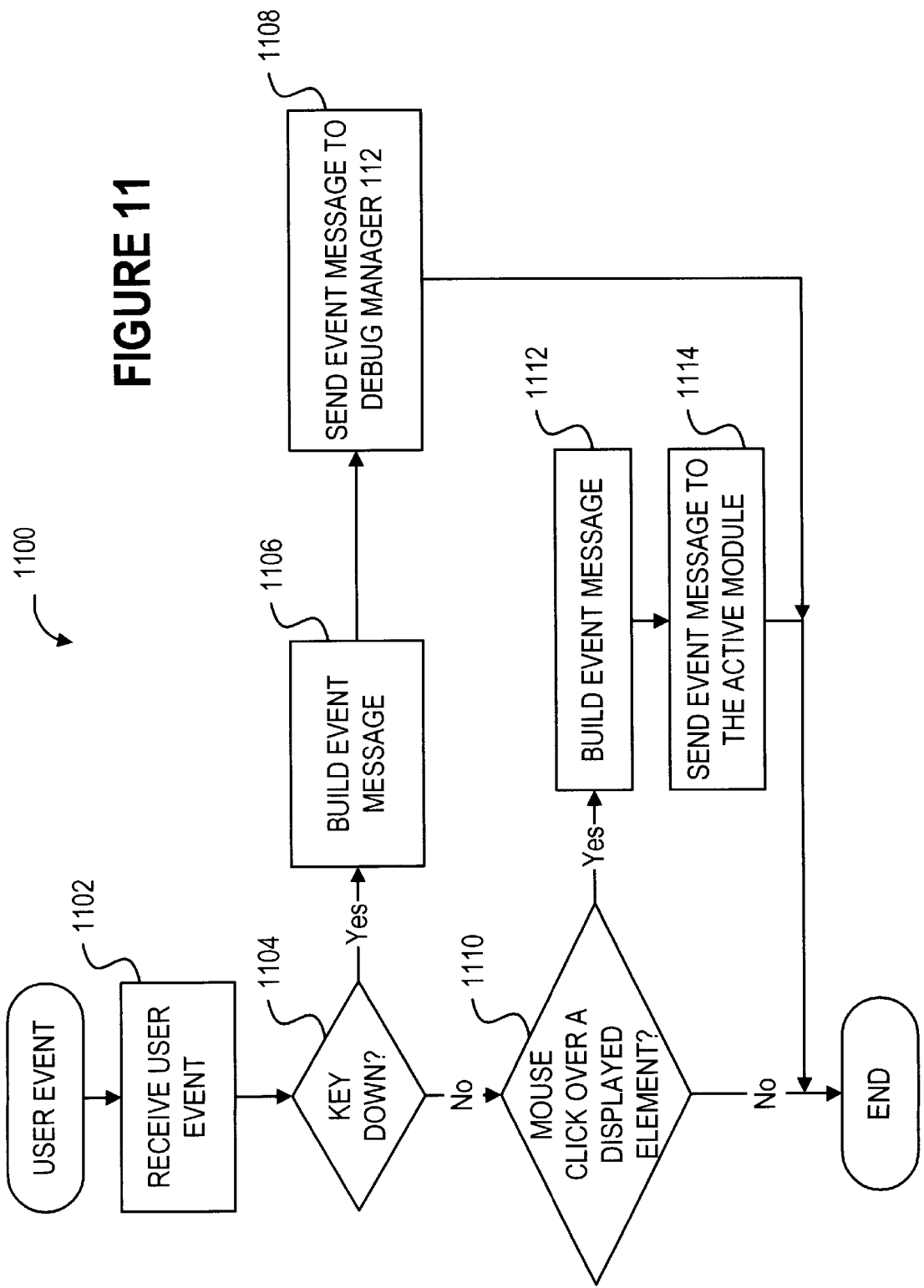
FIG. 11 is a logic flow diagram of the processing of the user interface module of FIG. 1.

GUI 108 processes events generated by user manipulation of user input devices 130A–B and sends event messages to modules such as module 110A to thereby communicate such events. This level of processing allows debug manager 112 to emulate such user events by sending similar messages to modules such as module 110A in the manner described below more completely. Processing by GUI 108 in response to a user event is shown in logic flow diagram 1100 (FIG. 11).

In step 1102, GUI 108 receives the user event. In test step 1104, GUI 108 determines whether the user event is a key press on a keyboard, e.g., user input device 130A. If so, GUI 108 builds an event message describing the user event, e.g., which key is pressed and at what time, in step 1106 and sends the event message to debug manager 112 in step 1108. Otherwise, GUI 108 determines whether the event is a mouse click, e.g., a click of a button on user input device 130B, while a cursor of computer display device 120A is positioned over an element of the multimedia display render in computer display device 120A. If so, GUI 108 builds an event message representing the event in step 1112 and sends the event message to the active module, e.g.,. module 110A, in step 1114. Otherwise, GUI 108 takes no action and the user event received in step 1102 is ignored.

Emulation of User Events by Debug Manager 112

Figure 12:
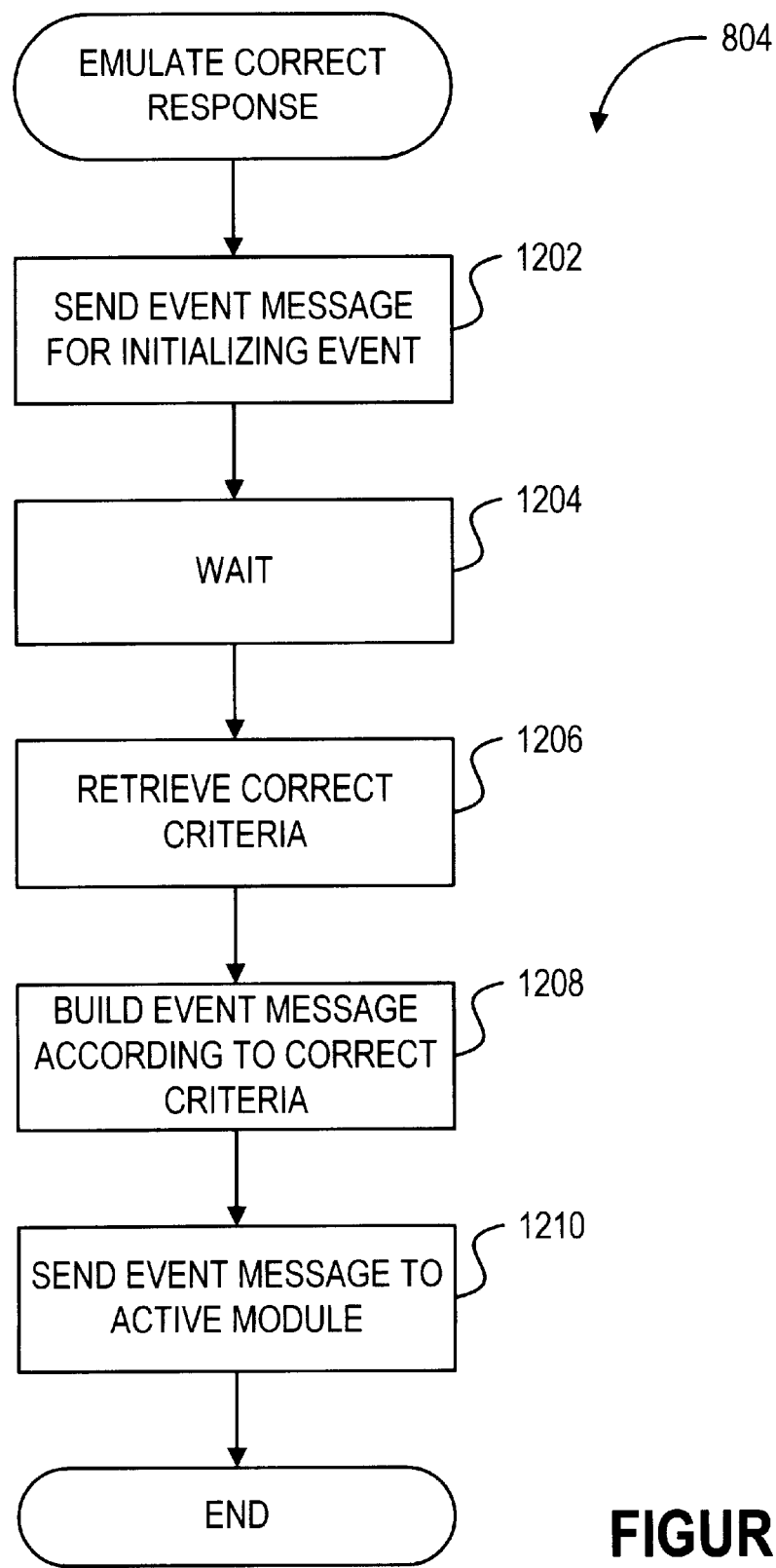
FIG. 12 is a logic flow diagram of the emulation of a user event by the debug manager of FIG. 1 in accordance with the present invention.

Emulation of a correct user response by debug manager in step 804 is shown in greater detail as logic flow diagram 804 (FIG. 12). In step 1202, debug manager 112 sends a trial initialization event message to module 110A. The trial initialization event message represents a user event on a trial initialization element such as a start button. The trial initialization event message is of the same structure and content as GUI 108 would build to represent a trial initialization event resulting from user manipulation of user input devices 130A–B during actual use of interactive multimedia application 100. Thus, in step 302 (FIG. 3), module 110A recognizes the trial initialization event whether from GUI 108 or debug manager 112.

In step 1204, debug manager 112 waits a predetermined period of time to allow module 110A to establish criteria for a correct response and to represent such criteria in correct criteria record 1002. In one embodiment, the predetermined period of time is one second.

In step 1206, debug manager 112 queries module 110A and receives therefrom correct criteria record 1002. It should be noted that module 110A serves such queries.

In step 1208, debug manager 112 builds an event message which represents a user event which satisfies the criteria represented in correct criteria record 1002. Debug manager 112 sends the event message to module 110A in step 1210. Module 110A receives the event message in step 306 (FIG. 3) and recognizes the event as a correct user response. Module 110A does not distinguish between event messages received from debug manager 112 and event messages received from GUI 108. Accordingly, emulated correct responses invoke precisely the same computer instruction invoked by actual use of interactive multimedia application 100 through manipulation of user input devices 130A–B.

Debug manager 112 emulates an incorrect response in generally the same manner except that the event message built in step 1208 represents a user event which does not satisfy the criteria represented in correct criteria record 1002.

Thus, in the debug mode, GUI 108 allows a user to explicitly specify a correct or incorrect response to stimuli, to begin and stop recording of user events, to start playback of previously recorded user events, to manipulate levels and/or categories, and to explicitly specify a reward animation for presentation when next earned. Accordingly, the user can precisely and quickly control play state 116 to have a particular level and category and to play a specific reward animation to thereby quickly and efficiently test all possible permutations of play state 116. In addition, GUI 108 allows the user to respond normally to multimedia stimuli presented on computer display devices 120A–B and such responses, once characterized, can be recorded for subsequent analysis and/or playback.

In short, the behavior of module 110A in steps 208–218 (FIG. 2) is precisely the same regardless of whether interactive multimedia application 100 executes in the debug mode. In this way, execution of interactive multimedia application 100 as manipulated by the user in the debug mode in the manner described above to explicitly specify correct or incorrect responses, to manipulate the various characteristics of play state 116, and to specify a particular reward animation to play next occurs as it would in the absence of the debug mode using precisely the same computer instructions to thereby accurately reflect the manner in which interactive multimedia application 100 will execute when in use by end users for which interactive multimedia application 100 is designed.

Record and Playback of User Events

As described above, in the debug mode, the user can start and stop recording of user events and can start playback of previously recorded user events. Such is particularly useful in testing interactive multimedia application 100. For example, very long streams of user events can be generated and allowed to control execution of interactive multimedia application 100 for extended periods of time. Such can emulate hours of continuous use of interactive multimedia application 100 by human users. In addition, several different user event streams can be run simultaneously on multiple, identical copies of interactive multimedia application 100 executing in homogeneous computer systems to simultaneously test different courses of action by a user. Furthermore, several user event streams can be run simultaneously on various heterogenous computer systems to test operation of interactive multimedia application 100 across different platforms. Of course, such emulations can be run sequentially, but running multiple emulations simultaneously significantly shortens development and verification of interactive multimedia application 100.

In addition, playback of recorded user events which cause failure of interactive multimedia application 100 during development or during use by an end user makes such failure repeatable and therefore correctable. Since the behavior of interactive multimedia application 100 is the same regardless of whether interactive multimedia application 100 executes in the debug mode, recording all events generated by a user's use of interactive multimedia application 100 provides sufficient information to recreate the state of play state 112 and the overall execution state of interactive multimedia application 100 of the failure.

The recording of user events is described above in the context of pseudo-code 304 (FIG. 4). In one embodiment, all user events are recorded in event stream 140B (FIG. 1) regardless of the recording state as represented in record mode 114B. Accordingly, unexpected errors can be reproduced and studied without requiring that recording of user events is explicitly requested. User events representing user responses during user of interactive multimedia application 100 can be gathered through a computer network in the manner described more completely in the Network Supervision Application and that description is incorporated herein by reference. In one embodiment, the user responses as gathered require translation from user response data to user event data in a form expected and recognized by debug manager 112 in the manner described above.

Operating Environment of the Interactive Multimedia Application

In this illustrative embodiment, interactive multimedia application is all or part of one or more computer processes executing within a computer system 1300 as shown in FIG. 13. Computer system 1300 includes a processor 1302 and memory 1304 which is coupled to processor 1302 through an interconnect 1306. Interconnect 1306 can be generally any interconnect mechanism for computer system components and can be, e.g., a bus, a crossbar, a mesh, a torus, or a hypercube. Processor 1302 fetches from memory 1304 computer instructions and executes the fetched computer instructions. In addition, processor 1302 can fetch computer instructions through a computer network 1340 through network access circuitry 1360 such as a modem or ethernet network access circuitry. Processor 1302 also reads data from and writes data to memory 1304 and sends data and control signals through interconnect 1306 to one or more computer display devices 120 and receives data and control signals through interconnect 1306 from one or more computer user input devices 130 in accordance with fetched and executed computer instructions.

Memory 1304 can include any type of computer memory and can include, without limitation, randomly accessible memory (RAM), read-only memory (ROM), and storage devices which include storage media such as magnetic and/or optical disks. Memory 1304 includes interactive multimedia application 100 which is all or part of a computer process which in turn executes within processor 1302 from memory 1304. Alternatively, interactive multimedia application 100 can be implemented as a collection of computer processes. A computer process is generally a collection of computer instructions and data which collectively define a task performed by computer system 1300.

Each of computer display devices 120 can be any type of computer display device including without limitation a printer, a cathode ray tube (CRT), a light-emitting diode (LED) display, or a liquid crystal display (LCD). Computer display devices 120 each receive from processor 1302 control signals and data and, in response to such control signals, display the received data. In addition, loudspeaker 120B plays audible sounds received from audio processing circuitry 120C. Loudspeaker 120B can be one or more loudspeakers, amplified or unamplified. For example, loudspeaker 120B can be a pair of headphones. Audio processing circuitry 120C receives digital audio signals and control signals from processor 1302 and produces analog audio signals in accordance therewith for reproduction through loudspeaker 120B. Computer display devices 120, and the control thereof by processor 1302, are conventional.

Each of user input devices 130 can be any type of user input device including, without limitation, a keyboard, a numeric keypad, or a pointing device such as an electronic mouse, trackball, lightpen, touch-sensitive pad, digitizing tablet, thumb wheels, joystick, or voice recognition device. Each of user input devices 1030 generates signals in response to physical manipulation by a user and transmits those signals through interconnect 1306 to processor 1302.

As described above, interactive multimedia application 100 executes within processor 1302 from memory 1304. Specifically, interactive multimedia application 100 is all or part of one or more computer processes executing within computer system 1300, i.e., processor 1302 fetches computer instructions of interactive multimedia application 100 from memory 1304 and executes those computer instructions. Processor 1302, in executing interactive multimedia application 100, enables user control of the execution of interactive multimedia application 100 in the debug mode in the manner described above and records user events for subsequent playback in the manner described above.

In this illustrative embodiment, processor 1302 is any of the Pentium series of microprocessors available from Intel Corporation of Santa Clara, Calif. and computer system 1300 is compatible with the PC personal computer available from International Business Machines of Atlanta, Ga. operating under the WINDOWS 95 operating system available from Microsoft Corporation of Redmond, Wash. Alternatively, computer system 1300 can be a Macintosh computer available from Apple Computer Inc. of Cupertino, Calif.

Debug Dialog

Figure 14:
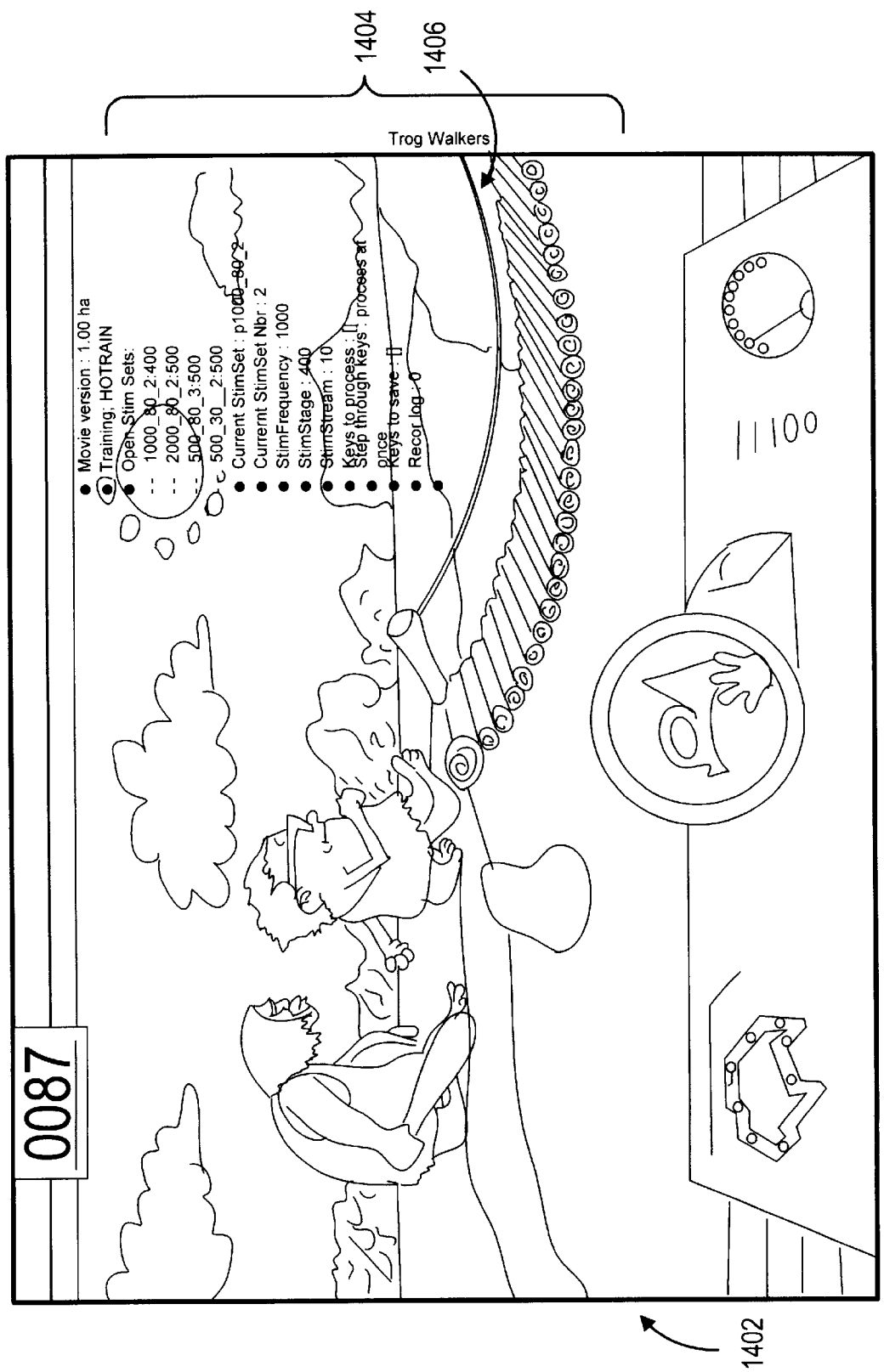
FIG. 14 is a screen view which includes a debug dialog displayed by the debug manager of FIG. 1.

FIG. 14 shows a video display 1402 of computer display device 120A. A debug dialog 1404 is displayed over video display 1402 with a transparent background such that much of video display 1402 is visible through debug dialog 1404. Debug dialog 1404 can be hidden or shown by issuing appropriate commands in the manner described above. Debug dialog 1404 includes various pieces of information regarding the state of interactive multimedia application 100 during execution. Such information includes version information, information regarding play state 116, and information regarding various fields of debug 112. A particularly useful piece of information provided in debug dialog 1404 is a counter 1406 which represent the amount of available memory, i.e., an additional amount of memory 1304 available to interactive multimedia application 100. Counter 1406 assists a tester in determining whether a particular failure of interactive multimedia application 100 is due to insufficient memory.

The above description is illustrative only and is not limiting. The present invention is limited only by the claims which follow.

What is claimed is:

1. A method for emulating use of an interactive module of an interactive multimedia application in which user events are classified into one of two or more categories of events according to classification criteria and are received by the interactive module from a user interface module in the form of a user event message, the method comprising:

receiving a user event which identifies a selected one of the categories;

forming an emulating user event message which represents an emulated user event which satisfies the classification criteria pertaining to the selected category; and sending the emulating user event message to the interactive module in a manner in which the user interface module sends the user event message to the interactive module;

wherein the classification criteria are specified within the interactive multimedia application.

2. The method of claim 1 wherein the two or more categories include correct emulated user events and incorrect emulated user events.

3. The method of claim 2 wherein the classification criteria are specified in context with stimuli presented by execution of the interactive multimedia application.

4. The method of claim 1 further comprising:

recording the user event in a computer memory.

5. The method of claim 1 wherein receiving the user event comprises:

retrieving data representing the user event from a computer memory.

6. A computer readable medium useful in association with a computer which includes a processor and a memory, the computer readable medium including computer instructions which are configured to cause the computer to emulate use of an interactive module of an interactive multimedia application in which user events are classified into one of two or more categories of events according to classification criteria and are received by the interactive module from a user interface module in the form of a user event message by:

receiving a user event which identifies a selected one of the categories;

forming an emulating user event message which represents an emulated user event which satisfies the classification criteria pertaining to the selected category; and sending the emulating user event message to the interactive module in a manner in which the user interface module sends the user event message to the interactive module;

wherein the classification criteria are specified within the interactive multimedia application.

7. The computer readable medium of claim 6 wherein the two or more categories include correct emulated user events and incorrect emulated user events.

8. The computer readable medium of claim 7 wherein the classification criteria are specified in context with stimuli presented by execution of the interactive multimedia application.

9. The computer readable medium of claim 6 wherein the computer instructions are configured to cause the computer to emulate use of an interactive module of an interactive multimedia application in which user events are classified into one of two or more categories of events according to classification criteria and are received by the interactive module from a user interface module in the form of a user event message by also:

recording the user event in a computer memory.

10. The computer readable medium of claim 6 wherein receiving the user event comprises:

retrieving data representing the user event from a computer memory.

11. A computer system comprising:

a processor;

a memory operatively coupled to the processor; and an emulation module (i) which executes in the processor from the memory and (ii) which, when executed by the processor, causes the computer to emulate use of an interactive module of an interactive multimedia application in which user events are classified into one of two or more categories of events according to classification criteria and are received by the interactive module from a user interface module in the form of a user event message by:

receiving a user event which identifies a selected one of the categories;

forming an emulating user event message which represents an emulated user event which satisfies the classification criteria pertaining to the selected category; and sending the emulating user event message to the interactive module in a manner in which the user interface module sends the user event message to the interactive module;

wherein the classification criteria are specified within the interactive multimedia application.

12. The computer system of claim 11 wherein the two or more categories include correct emulated user events and incorrect emulated user events.

13. The computer system of claim 12 wherein the classification criteria are specified in context with stimuli present ed by execution of the interactive multimedia application.

14. The computer system of claim 11 wherein the emulation module, when executed, causes the computer to emulate use of an interactive module of an interactive multimedia application in which user events are classified into one of two or more categories of events according to classification criteria and are received by the interactive module from a user interface module in the form of a user event message by also:

recording the user event in a computer memory.

15. The computer system of claim 11 wherein receiving the user event comprises:

retrieving data representing the user event from a computer memory.

* * * * *